June 4, 1957 YERVANT H. KURKJIAN 2,794,436
CLOG-PREVENTING NURSING NIPPLE
Filed Oct. 17, 1955
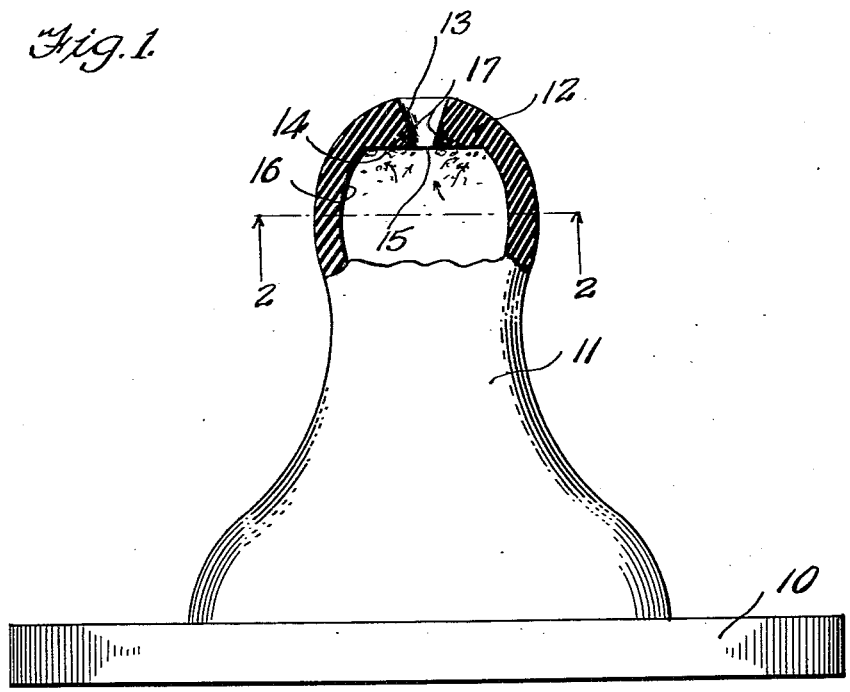
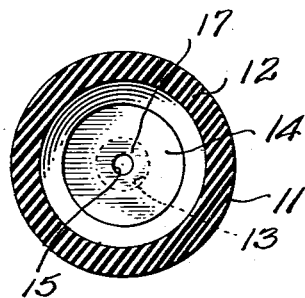
INVENTOR
YERVANT H. KURKJIAN
BY
HIS ATTORNEY

United States Patent Office 2,794,436
Patented June 4, 1957

2,794,436
CLOG-PREVENTING NURSING NIPPLE

Yervant H. Kurkjian, Clifton, N. J.

Application October 17, 1955, Serial No. 540,892

3 Claims. (Cl. 128—252)

This invention relates to nipples, and has for one of its objects the production of a clog-preventing means for the discharge end of the nipple so as to prevent particles of milk from clogging the discharge aperture of the nipple.

Another object of this invention is the production of a specially constructed inner wall at the discharge end of the nipple, rearwardly or inwardly of the discharge aperture to prevent particles of milk from accumulating or settling around and in the inner end of the discharge aperture and thereby prevent clogging of the nipple.

Other objects and advantages will appear throughout the following specification and claims.

In the drawing:

Figure 1 is an enlarged side elevational view of the nipple, the discharge end thereof being shown in section to illustrate the nature of the discharge end of the nipple which surrounds the discharge aperture; and Figure 2 is a sectional view taken on line 2—2 of Figure 1.

By referring to the drawing in detail, it will be seen that 10 designates the flange of the nipple which carries the neck portion 11 thereof. The discharge end 12 of the neck portion is provided with an outwardly flared or inwardly tapering discharge aperture 13 in the nature of an inverted cone, which preferably is located centrally of the outer discharge end 12, as is shown in the enlarged view Figure 1.

A flat wall 14 extends directly below the restricted intake portion 15 of the aperture 13, and this flat wall 14 preferably extends transversely of the longitudinal axis of the neck portion 11 of the nipple and also extends radially from the intake portion 15 to the inner wall 16 of the neck 11 of the nipple. The inner peripheral edge 17 is extremely flexible since the convergence of the flat bottom wall 14 with the outwardly flared wall of the tapering discharge aperture 13 provides a narrowing tapered or wedge-shaped terminus restricted intake portion at the intake portion of the aperture 13. This extremely flexible peripheral edge 17 by having maximum flexibility will freely flex when contacted by particles of milk, thereby permitting said particles to be freely carried through the intake portion 15 by the flow of liquid and into the outward flared discharge aperture 13. These particles, because of the outward flared nature of the discharge aperture 13, will then flow freely out of the aperture 13 since the diameter of the aperture 13 increases in an outward direction.

The flat wall 14 which extends laterally of the aperture 13 at substantially right-angles to the longitudinal axis of the aperture 13 and the neck 11 provides an abutment against which semi-solid particles of milk will strike and be diffused or distributed around and away from the intake portion 15 of the aperture 13 without settling around and in the intake portion, while an infant is nursing. This flat wall not only provides this distributing abutment, but in combination with the tapered aperture provides the extremely flexible peripheral edge 17 having maximum flexibility to release any particles of milk which may contact the intake portion 15 and cause these particles to float through the outward flared aperture 13. Consequently, the combination of the tapering aperture 13 and the flat wall 14 produces the extremely flexible peripheral edge 17, the function of which is to automatically shed, and to free and release, particles of milk entering from the intake portion 15 of the aperture 13, and thereby prevent clogging of the aperture while an infant is nursing.

Having described the invention, what is claimed as new is:

1. A nipple of the class described comprising a body, said body having a discharge aperture, said aperture having an inner intake portion and being flared outwardly from said intake portion, said body having a wall extending substantially at right-angles to the longitudinal axis of said aperture and radially thereof thereby defining a tapering wedge-like peripheral edge in cross-section at the entrance of the intake portion.

2. A nipple as defined in claim 1, wherein said wall is substantially flat and is adapted to diffuse and distribute particles of milk contacting said wall away from said intake portion of said aperture.

3. A nipple as defined in claim 1, wherein said peripheral edge possesses extreme and maximum flexibility to automatically shed and free any milk particles entering said intake portion, and discharge said particles outwardly through said outwardly flared aperture.

References Cited in the file of this patent

UNITED STATES PATENTS 2,630,118     Casey _____ Mar. 3, 1953

FOREIGN PATENTS 146,760     Great Britain _____ July 15, 1920